(12) United States Patent
Uezono et al.

(10) Patent No.: US 7,637,101 B2
(45) Date of Patent: Dec. 29, 2009

(54) HYDRAULIC POWER TRANSMISSION DEVICE AND WORK VEHICLE

(75) Inventors: Kenji Uezono, Ushiku (JP); Seishi Morishita, Inashiki-gun (JP); Akira Takeshita, Ryugasaki (JP); Kiyoyasu Hasegawa, Ryugasaki (JP); Koji Hyodo, Kasumigaura (JP); Koji Takano, Tsukuba (JP)

(73) Assignees: TCM Corporation, Tokyo (JP); Hitachi Construction Machinery Co., Ltd., Tokyo (JP)

( * ) Notice: Subject to any disclaimer, the term of this patent is extended or adjusted under 35 U.S.C. 154(b) by 289 days.

(21) Appl. No.: 11/885,955

(22) PCT Filed: Mar. 9, 2006

(86) PCT No.: PCT/JP2006/304599

§ 371 (c)(1),
(2), (4) Date: Sep. 10, 2007

(87) PCT Pub. No.: WO2006/095813

PCT Pub. Date: Sep. 14, 2006

(65) Prior Publication Data

US 2008/0271564 A1    Nov. 6, 2008

(30) Foreign Application Priority Data

Mar. 10, 2005   (JP)   .............................. 2005-066705

(51) Int. Cl.
*F16D 31/02*    (2006.01)
*F16D 39/00*    (2006.01)

(52) U.S. Cl. .............................. 60/425; 60/484; 60/487

(58) Field of Classification Search .................... 60/425, 60/435, 483, 484, 487
See application file for complete search history.

(56) References Cited

U.S. PATENT DOCUMENTS 3,421,389 A    1/1969   Fauchere (Continued)

FOREIGN PATENT DOCUMENTS

JP    50-148477 U    12/1975

(Continued)

OTHER PUBLICATIONS

International Search Report dated May 16, 2006 (PCT/ISA/210) (Two (2) pages).

*Primary Examiner*—Michael Leslie
(74) *Attorney, Agent, or Firm*—Crowell & Moring LLP

(57) ABSTRACT

A hydraulic power transmission device in a work vehicle transmits motive power from two hydraulic motors disposed in parallel to each other. The hydraulic power transmission device includes: a case; a first motor shaft and a second motor shaft respectively disposed in a right-side area and in a left-side area inside the case, each linked to one of the two hydraulic motors; a counter shaft disposed in an area ranging between the first motor shaft and the second motor shaft in the case; an output shaft; a first transmission mechanism that transmits motive power from the first motor shaft to the output shaft via the counter shaft; a second transmission mechanism that transmits motive power from the second motor shaft to the output shaft; and a hydraulic clutch device disposed at the counter shaft, that transmits the motive power from the first motor shaft to the output shaft or cuts off transmission of the motive power.

20 Claims, 7 Drawing Sheets

U.S. PATENT DOCUMENTS

| | | | |
|---|---|---|---|
| 3,655,004 A * | 4/1972 | Hoashi | 60/483 |
| 5,159,992 A | 11/1992 | Reinecke et al. | |
| 6,269,713 B1 | 8/2001 | Ohke | |
| 6,276,134 B1 * | 8/2001 | Matsuyama et al. | 60/425 |
| 7,082,760 B2 * | 8/2006 | Legner et al. | 60/487 |

FOREIGN PATENT DOCUMENTS

| | | |
|---|---|---|
| JP | 2-240442 A | 9/1990 |
| JP | 11-230307 A | 8/1999 |
| JP | 2001-82404 A | 3/2001 |
| JP | 2001-200907 A | 7/2001 |
| JP | 2001-336602 A | 12/2001 |
| JP | 2003-164014 A | 6/2003 |

* cited by examiner

FRONT ←——→ REAR

FROM PUMP IN BODY

FRONT ←——————→ REAR

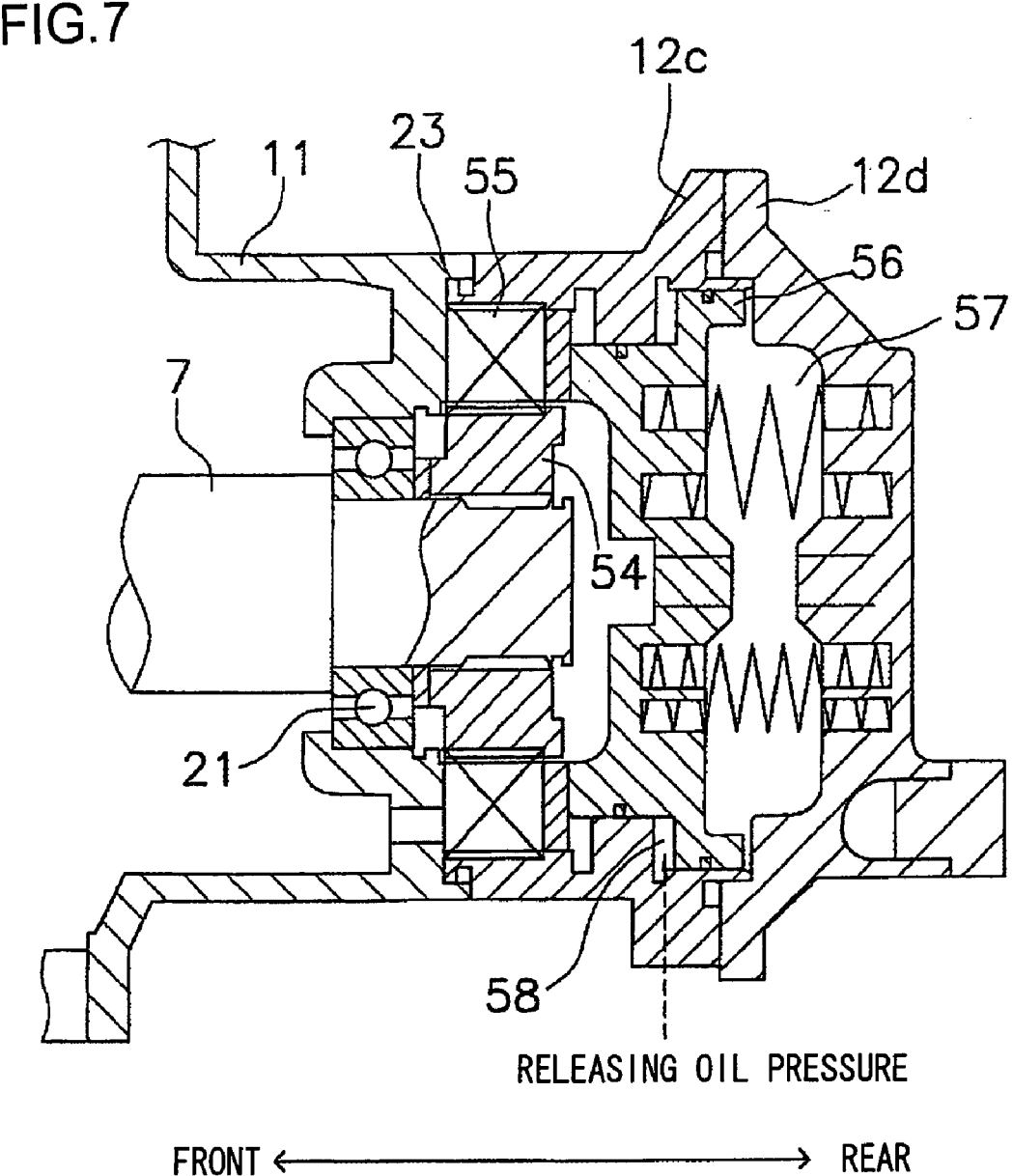

HYDRAULIC POWER TRANSMISSION DEVICE AND WORK VEHICLE

TECHNICAL FIELD

The present invention relates to a hydraulic power transmission device and a work vehicle equipped with the hydraulic power transmission device.

TECHNICAL FIELD

Power transmission devices installed in work vehicles such as wheel loaders include those equipped with a hydraulic pump driven by an engine and two hydraulic motors connected in parallel with the hydraulic pump, which selectively transmit the motive power from the hydraulic motors to an output shaft.

One such power transmission device includes a first motor shaft connected to a first hydraulic motor, a second motor shaft connected to a second hydraulic motor via a planetary gear device, an output shaft and a hydraulic clutch disposed between the second motor shaft and the second hydraulic motor (see patent reference literature 1). In this device, a first input gear, a second input gear and an output gear are respectively disposed at the first motor shaft, the second motor shaft and the output shaft, with the first input gear and the second input gear interlocking with the output gear. In a low-speed traveling state, the hydraulic clutch is engaged so that the motive power from both the first hydraulic motor and the second hydraulic motor is transmitted to the output shaft to drive the load with high torque. In a high-speed traveling state, on the other hand, the hydraulic clutch is disengaged via a hydraulic control valve so that the motive power from the first hydraulic motor alone is transmitted to the output shaft to drive the load at high speed.

Patent reference literature 1: Japanese Laid Open Patent Publication No. 2001-82404

DISCLOSURE OF THE INVENTION

Problems to be Solved by the Invention

A spline connector portion by which members are connected, the gear interlocking areas and the bearings supporting the individual shafts need to be lubricated with lubricating oil in a power transmission device installed in a work vehicle or the like. Accordingly, the lubricating oil having lubricated the hydraulic clutch is then dispersed over areas requiring lubrication so as to lubricate the various members. However, this method does not readily assure the full lubricating effect. Namely, in the device disclosed in the publication cited above, the second motor shaft linked to the hydraulic clutch is disposed further toward the left side or toward the right side instead of at the center of the case and, for this reason, the bearings, the gears and the like disposed around the second motor shaft cannot be evenly lubricated with the lubricating oil dispersed from the hydraulic clutch. A forced lubricating oil delivery method, on the other hand, requires a lubricating oil passage constituted with holes, lubrication pipe and the like, which is bound to result in an increase in the cost.

Means For Solving The Problems

A hydraulic power transmission device in a work vehicle according to a first aspect of the present invention, which transmits motive power from two hydraulic motors disposed in parallel to each other, includes: a case; a first motor shaft and a second motor shaft respectively disposed in a right-side area and in a left-side area inside the case, each linked to one of the two hydraulic motors; a counter shaft disposed in an area ranging between the first motor shaft and the second motor shaft in the case; an output shaft; a first transmission mechanism that transmits motive power from the first motor shaft to the output shaft via the counter shaft; a second transmission mechanism that transmits motive power from the second motor shaft to the output shaft; and a hydraulic clutch device disposed at the counter shaft, that transmits the motive power from the first motor shaft to the output shaft or cuts off transmission of the motive power.

It is preferable that the counter shaft is disposed in parallel to the first motor shaft and the second motor shaft at a position set apart from the first motor shaft and the second motor shaft by substantially equal distances. It is preferable that the counter shaft is disposed higher up than the first motor shaft and the second motor shaft. It is preferable that the output shaft is disposed below the counter shaft. The hydraulic clutch device may be configured to enter a power transmission state as pressure oil is supplied to the hydraulic clutch device and to enter a power cut-off state when pressure oil is not supplied to the hydraulic clutch device.

It is preferable that the first transmission mechanism includes an input-side transmission unit that transmits the motive power from the first motor shaft to the counter shaft and an output-side transmission unit that transmits the motive power from the counter shaft to the output shaft; and that the input-side transmission unit and the output-side transmission unit each reduce a rate of rotation input thereto and transmit power at a reduced rotation rate to an output side.

It is preferable that the hydraulic power transmission device according to the first aspect further includes an output gear fixed to the output shaft, the first transmission mechanism includes a first gear fixed to the first motor shaft, an input-side counter gear fixed to the counter shaft and meshing with the first gear, and an output-side counter gear disposed at the counter shaft so as to allow relative rotation and meshing with the output shaft; the second transmission mechanism includes a second gear fixed to the second motor shaft and meshing with the output gear; and the hydraulic clutch device is disposed between the input-side counter gear and the output-side counter gear.

It is preferable that the hydraulic power transmission device according to the first aspect further includes a. hydraulic parking brake used when parking the work vehicle, and that the hydraulic parking brake is configured to enter a braking state when no pressure oil is supplied to the hydraulic parking brake and to enter a brake-release state when pressure oil is supplied to the hydraulic parking brake. The hydraulic parking brake may be disposed at the second motor shaft.

It is preferable that the hydraulic power transmission device according to the first aspect further includes a lubricating oil supply passage formed at the counter shaft, and that lubricating oil delivered via the lubricating oil passage is dispersed from the hydraulic clutch device as the counter shaft rotates. A control valve through which oil pressure supplied from a hydraulic source to the hydraulic clutch device is controlled and a relief valve disposed between the hydraulic source and the control valve may be further provided, and the lubricating oil may be supplied to the lubricating oil passage from the hydraulic source via the relief valve.

It is preferable that through holes be further provided that individually formed above an opening at which the first motor shaft is supported and above an opening at which the second motor shaft is supported at an end surface of the case located toward the two hydraulic motors, and that the lubricating oil advance toward the two hydraulic motors via the through holes.

A work vehicle according to a second aspect of the present invention is equipped with the above described hydraulic power transmission device.

Advantageous Effect of the Invention

According to the present invention, the first motor shaft, the second motor shaft and the like can be lubricated evenly with lubricating oil dispersed from the hydraulic clutch device disposed at the counter shaft.

BRIEF DESCRIPTION OF THE DRAWINGS

FIG. 7 is a sectional view of the parking brake in an enlargement.

BEST MODE FOR CARRYING OUT THE INVENTION

Figure 1:
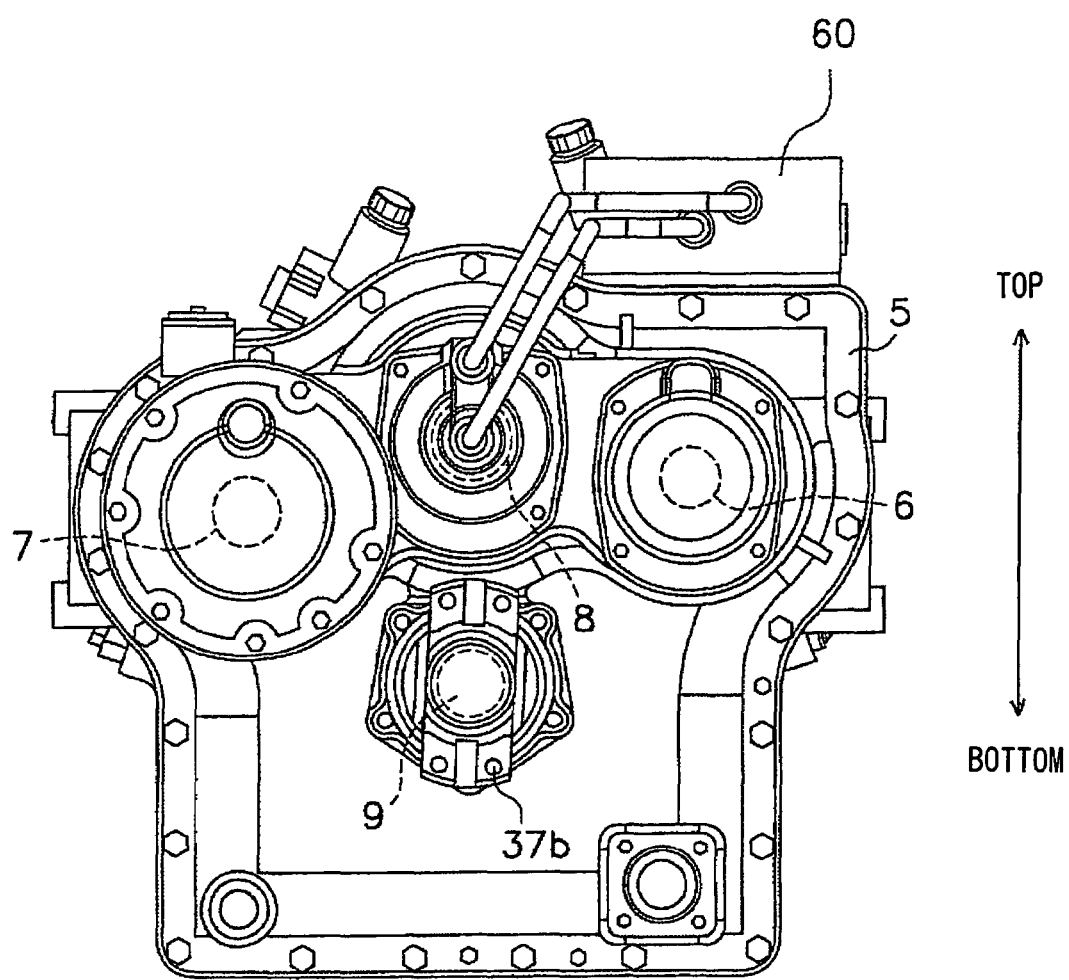
FIG. 1 presents an external view of a power transmission device achieved in an embodiment of the present invention, taken from the rear side.
Figure 2:
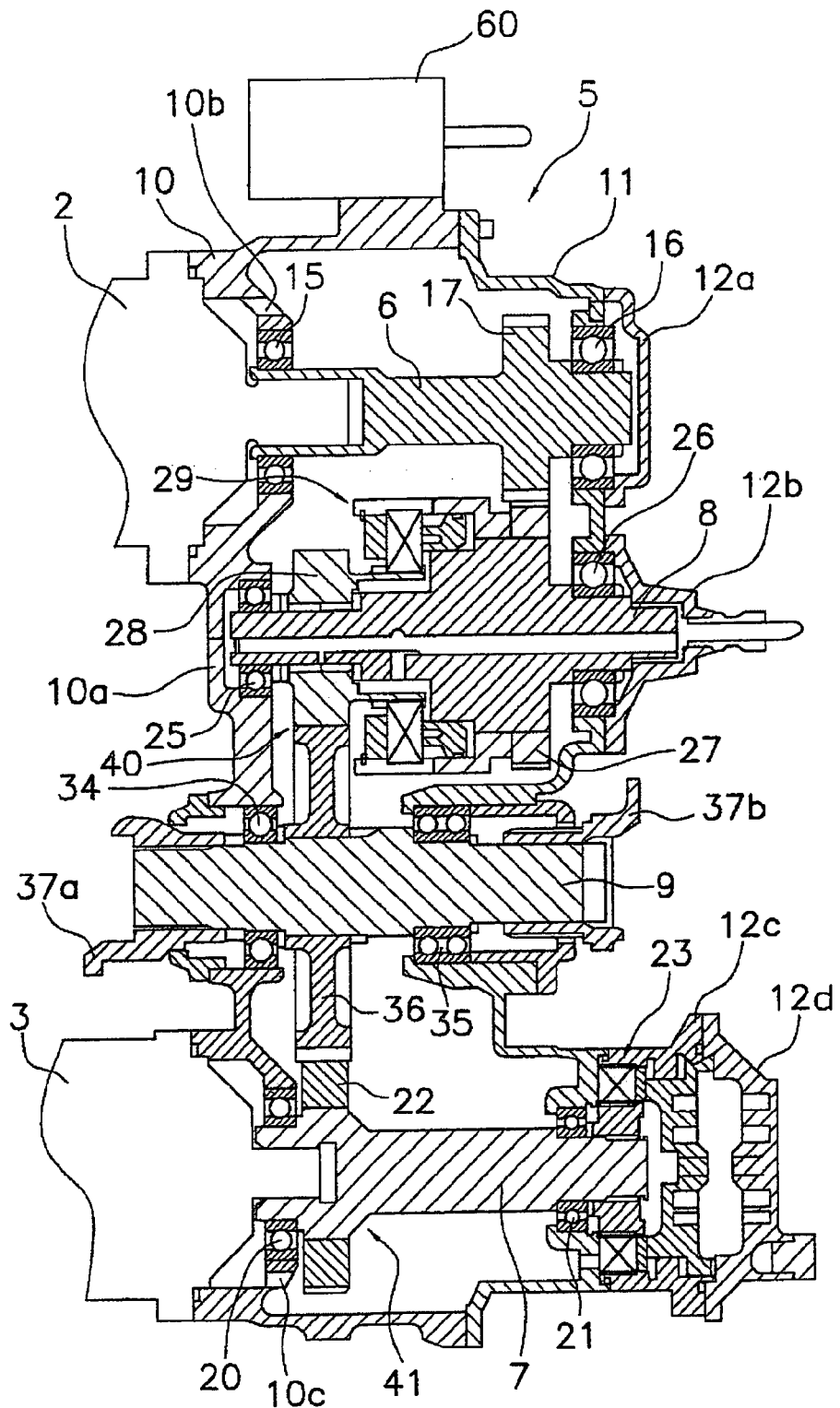
FIG. 2 is a sectional development of the power transmission device shown in FIG. 1.
Figure 3:
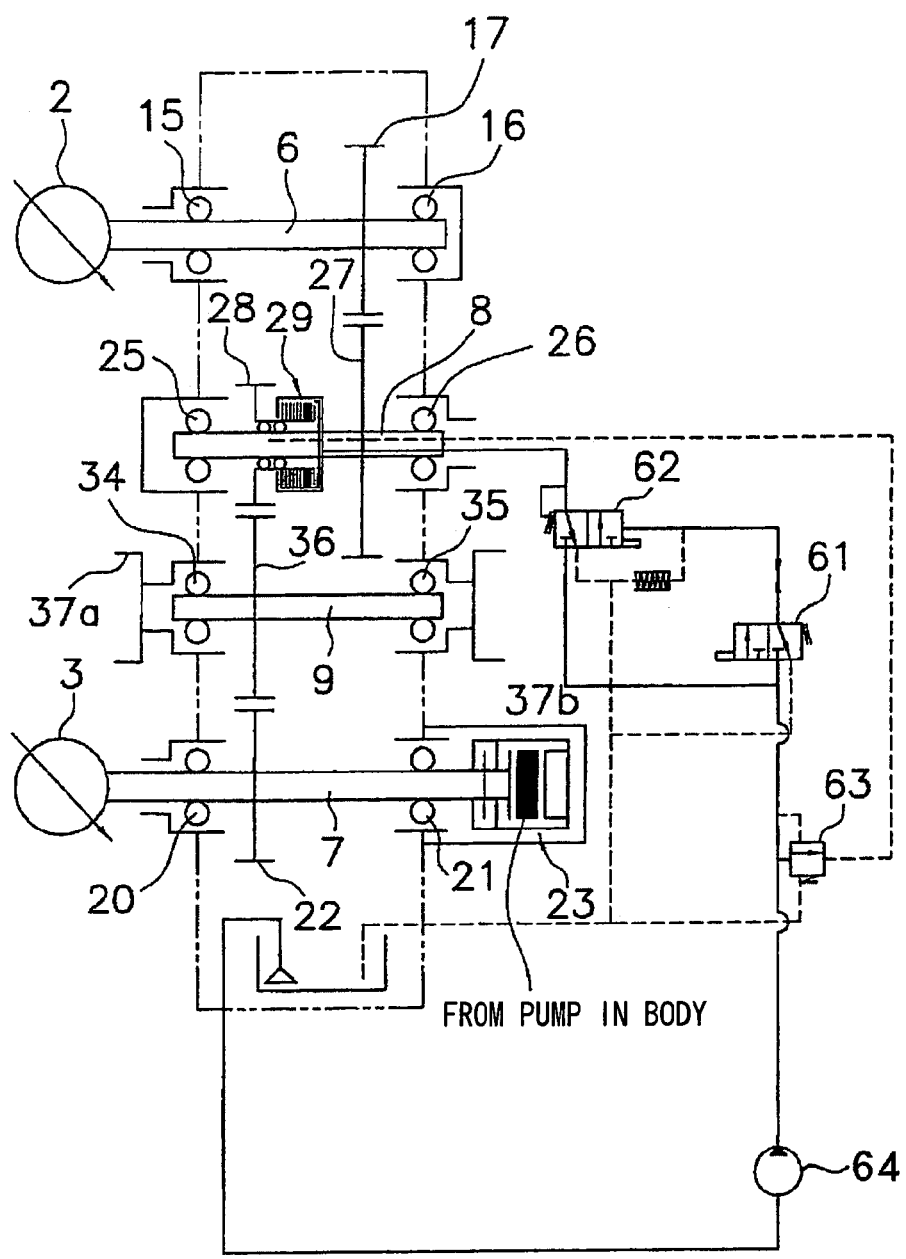
FIG. 3 is a schematic diagram of the power transmission device in FIG. 1, showing its hydraulic circuit.

FIG. 1 presents an external view of a power transmission device 100 achieved in an embodiment of the present invention. In addition, FIG. 2 presents a sectional development of the power transmission device 100 and FIG. 3 presents a schematic diagram of the power transmission device including its hydraulic circuit. The following explanation is given by assuming that the upper side and the lower side in FIG. 1 are respectively the top side and the bottom side and that the left side and the right side in FIG. 2 are respectively the front side and the rear side. FIG. 1 shows the power transmission device 100 mounted in a work vehicle, viewed from the rear. It is to be noted that FIG. 2 is a development of a section of the power transmission device 100 taken along the axial direction and that the top/bottom positional relationship in FIG. 2 is different from the top/bottom positional relationship in FIG. 1.

(Overall Structure)

Figure 4:
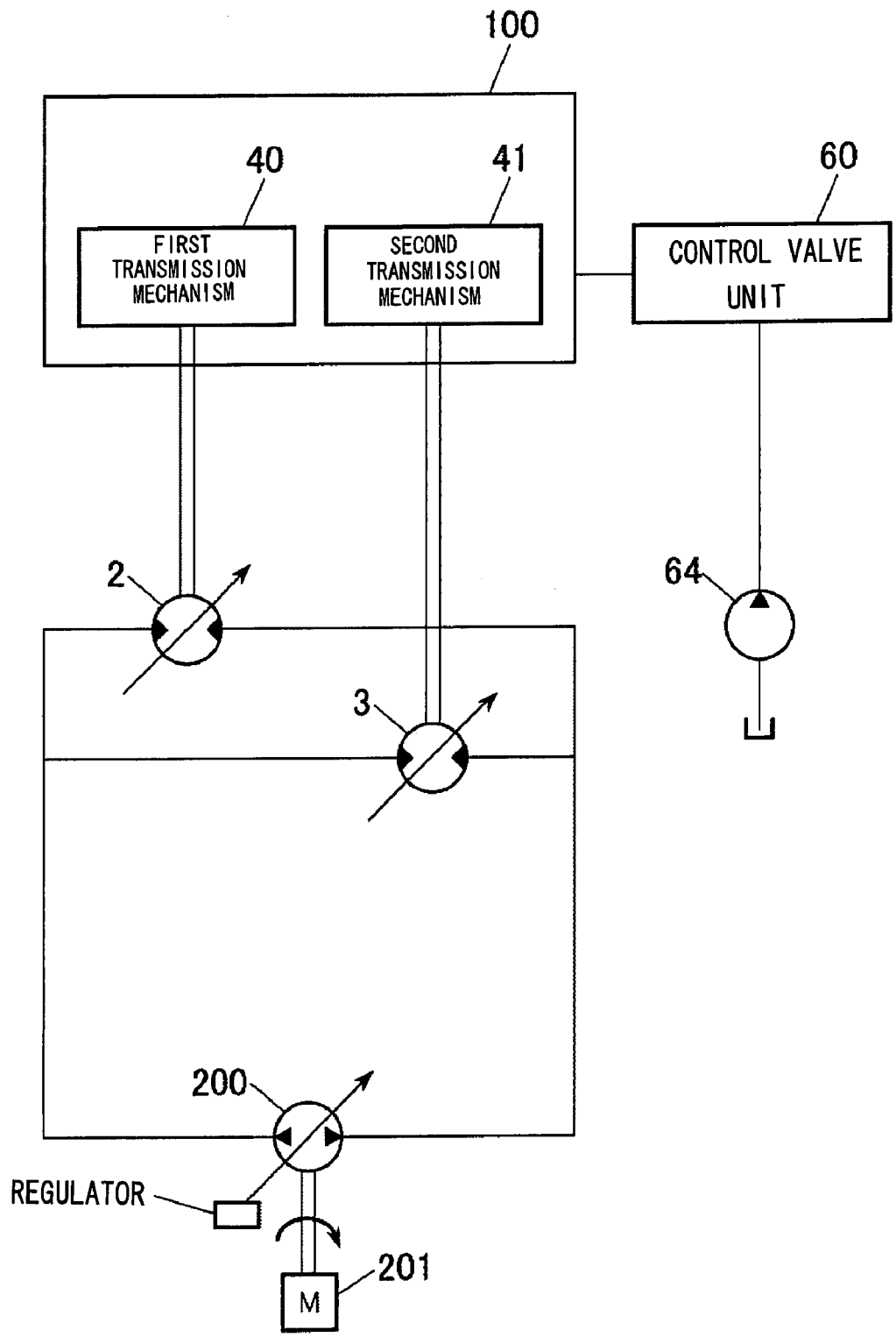
FIG. 4 schematically illustrates the traveling hydraulic circuit in a work vehicle equipped with the power transmission device.

FIG. 4 presents a schematic circuit diagram of the traveling hydraulic circuit in the work vehicle equipped with the power transmission device 100. While the power transmission device may be installed in a wheel loader, wheel excavator, a forklift, a snowplow or the like, the explanation is given by assuming that it is mounted in a wheel loader. As shown in FIG. 4, the traveling hydraulic circuit is an HST traveling circuit assuming a closed circuit connection with a low-speed side first hydraulic motor 2 and a high-speed side second hydraulic motor 3 connected in parallel to a single main hydraulic pump 200 that is driven by an engine 201. It is to be noted that peripheral circuits including displacement control devices for the hydraulic pump 200 and the first and second hydraulic motors 2 and 3 are not included in the illustration.

The power transmission device 100 includes a first transmission mechanism 40 that transmits the motive power imparted by the first hydraulic motor 2 and a second transmission mechanism 41 that transmits the motive power imparted by the second hydraulic motor 3 and selectively transmits the motive power from the first hydraulic motor 2 and/or the second hydraulic motor 3. The power transmission device 100 comprises a first motor shaft 6 connected to the first hydraulic motor 2, a second motor shaft 7 connected to the second hydraulic motor 3, a counter shaft 8 and an output shaft 9, which are all housed in a case 5.

As shown in FIG. 2, the case 5 includes a main case 10 located on the front side, i.e., toward the hydraulic motors 2 and 3, a sub-case 11 fixed on the rear side of the main case 10, and a plurality of end covers 12a, 12b, 12c and 12d fixed on the rear side of the sub-case 11. A front wall 10a is formed on the front side of the main case 10, and the two hydraulic motors 2 and 3 are supported at the front wall 10a. A plurality of openings are formed on the front wall 10a, and the first motor shaft 6, the second motor shaft 7 and the output shaft 9 are each disposed within one of these openings. In addition, through holes 10b and 10c through which lubricating oil is to pass are formed respectively above the opening at which the first motor shaft 6 is inserted and above the opening at which the second motor shaft 7 is inserted at the front wall 10a. It is to be noted that in FIG. 2, which is a development, the through hole 10c is shown under the opening.

The first motor shaft 6 is rotatably supported by the main case 10 and the sub-case 11 respectively via bearings 15 and 16, and is disposed over an upper right-side area inside the case 5, viewed from the rear as shown in FIG. 1. In addition, a spline hole is formed at the first motor shaft 6 at its front end, and the motor shaft of the first hydraulic motor 2 is spline-coupled at the spline hole. A first gear 17 is formed as an integrated part of the first motor shaft 6.

The second motor shaft 7 is rotatably supported by the main case 10 and the sub-case 11 respectively via bearings 20 and 21, and is disposed over an upper left-side area inside the case 5, viewed from the rear as shown in FIG. 1. In addition, a spline hole is formed at the second motor shaft 7 at its front end, and the motor shaft of the second hydraulic motor 3 is spline-coupled at the spline hole. A parking brake 23 to be detailed later is disposed at the rear end of the second motor shaft 7.

The counter shaft 8 is rotatably supported at the main case 10 and the sub-case 11 respectively via bearings 25 and 26. The counter shaft 8 is disposed at a substantial center of the case 5 between the first motor shaft 6 and the second motor shaft 7 further up relative to the motor shafts 6 and 7, viewed from the rear, as shown in FIG. 1. Namely, the counter shaft is disposed at a position set apart from the two motor shafts 6 and 7 by substantially equal distances. The counter shaft 8, an input-side counter gear 27 is fixed t its rear end in such a manner that relative rotation is disallowed and an output-side counter gear 28 is supported at its front end via a bearing 30 (see FIG. 5) so that it is allowed to rotate freely relative to the counter shaft. The input-side counter gear 27 interlocks with the first gear 17 at the first motor shaft 6. As shown in detail in FIG. 5, the output-side counter gear 28 includes a gear portion 28a and a cylindrical spline portion 28b projecting out along the axial direction from the rear end of the gear portion 28a.

In addition, a hydraulic clutch 29 is disposed at the counter shaft 8, with a clutch hydraulic oil passage through which clutch hydraulic oil for engaging the hydraulic clutch 29 in operation is delivered and a lubricating oil passage through which lubricating oil is delivered formed at the counter shaft 8 to range along the axial direction and the radial direction.

The hydraulic clutch 29, the clutch hydraulic oil passage and the lubricating oil passage are to be described in detail later.

The output shaft 9 is rotatably supported at the main case 10 and the sub-case 11 respectively via bearings 34 and 35 and is disposed substantially directly under the counter shaft 8. An output gear 36, fixed to the output shaft 9 in such a manner that relative rotation is disallowed, interlocks with a second gear 22 and the output-side counter gear 28. In addition, output flanges 37a and 37b are each spline-connected to either end of the output shaft 9.

As shown in FIG. 1, the power transmission device 100 in the embodiment includes the first motor shaft 6 and the second motor shaft 7 respectively disposed over the right-side area and over the left-side area inside the case 5 and the counter shaft 8 and the output shaft 9 disposed over the central area between the first motor shaft 6 and the second motor shaft 7 in the case 5. The counter shaft 8 assumes a position that allows the first motor shaft 6 and the second motor shaft 7 to be effectively lubricated with lubricating oil dispersed from the hydraulic clutch 29. In other words, the counter shaft 8 is disposed at a position higher up relative to the first motor shaft 6 and the second motor shaft 7, while ensuring that an extension of the counter shaft 8, extending along the axial direction and lying parallel to, and between the first hydraulic motor 2 and the second hydraulic motor 3, does not protrude beyond the upper ends of the exteriors of the hydraulic motors 2 and 3.

In the power transmission device 100, the first gear 17, the input-side counter gear 27 and the output-side counter gear 28 constitute the first transmission mechanism 40, which transmits the motive power imparted by the first motor shaft 6 to the output shaft 9 via the counter shaft 8 and the second gear 22 constitutes the second transmission mechanism 41, which transmits the motive power imparted by the second motor shaft 7 to the output shaft 9. The speed reducing ratio to be achieved by the first gear 17 and input-side counter gear 27 (at the input-side transmission unit) may be set to, for instance, 2.000, whereas the speed reducing ratio to be achieved by the output-side counter gear 28 and the output gear 36 (at the output-side transmission unit) may be set to, for instance, 1.725. In addition, the speed reducing ratio to be achieved by the second gear 22 and the output gear 36 may be set to, for instance, 1.550.

(Hydraulic Clutch)

Figure 5:
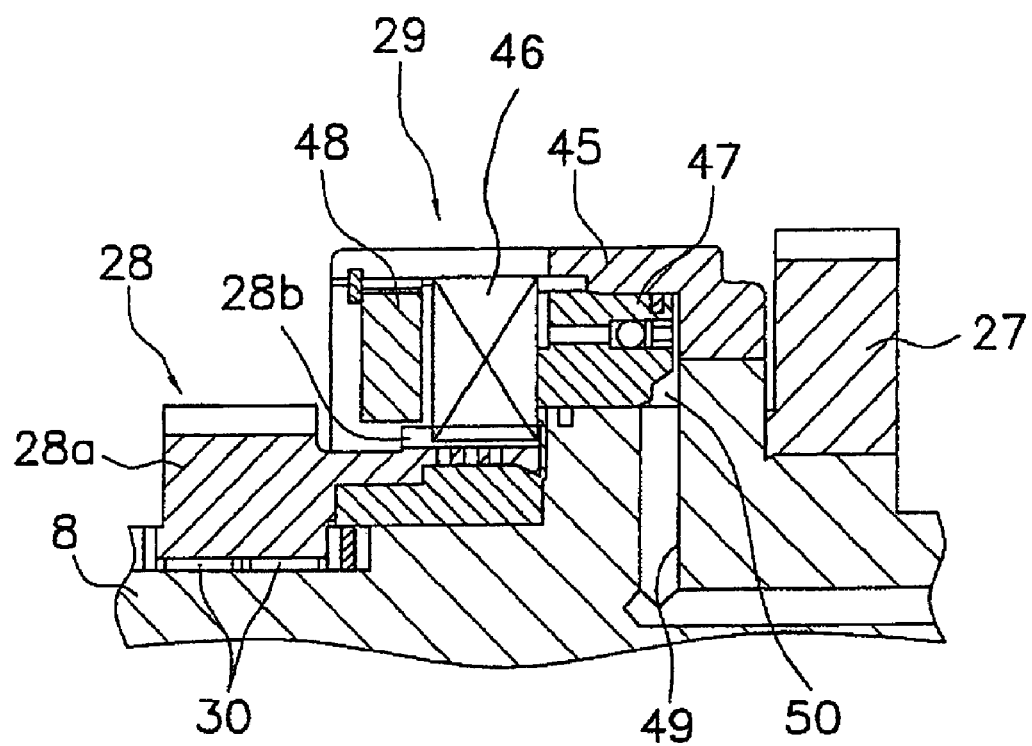
FIG. 5 is a partial enlargement, showing the hydraulic clutch in a sectional view.

FIG. 5 presents a partial enlargement showing the hydraulic clutch 29 in detail in a sectional view. The hydraulic clutch 29, disposed at the counter shaft 8, transmits the motive power from the first motor shaft 6 to the output shaft 9 or cuts off the transmission of the motive power. More specifically, the hydraulic clutch is a mechanism that transmits the motive power input from the first gear 17 to the input-side counter gear 27, i.e., the counter shaft 8, to the output-side counter gear 28 or cuts off the transmission of the motive power. The hydraulic clutch 29 is engaged in operation by the hydraulic pressure oil supplied from an oil pump 64 (see FIGS. 3 and 4) via a control valve unit 60. The hydraulic clutch 29 is a positive-type hydraulic clutch, which assumes a power cut-off state when no pressure oil is supplied and assumes a power transmission state when pressure oil is supplied.

The hydraulic clutch 29 includes a cylindrical clutch case 45 fixed onto the outer circumference of the counter shaft 8 and a clutch disk unit 46 and a piston 47 disposed inside the clutch case 45.

The clutch disk unit 46, disposed between the clutch case 45 and the spline portion 28b of the output-side counter gear 28, includes a plurality of first clutch plates and second clutch plates alternately disposed along the axial direction. The first clutch plates each include an engaging portion located on the outer circumferential side thereof, which engages the clutch case 45, whereas the second clutch plates each include an engaging portion located on the inner circumferential side thereof, which engages with the spline portion 28b of the output-side counter gear 28. The first and second clutch plates have friction surfaces. A backup ring 48 that regulates the displacement of the clutch disk unit 46 along the axial direction, i.e., along the forward/backward direction, is disposed to the front of the clutch disk unit 46.

The piston 47, caused to slide along the axial direction by the pressure of the oil supplied into an oil chamber 50 via an oil passage 49, presses the first and second clutch plates at the clutch disk unit 46 against each other. It is to be noted that a return spring (not shown) is used to keep the piston 47 away from the clutch disk unit 46 when the pressure oil is not supplied.

Figure 6:
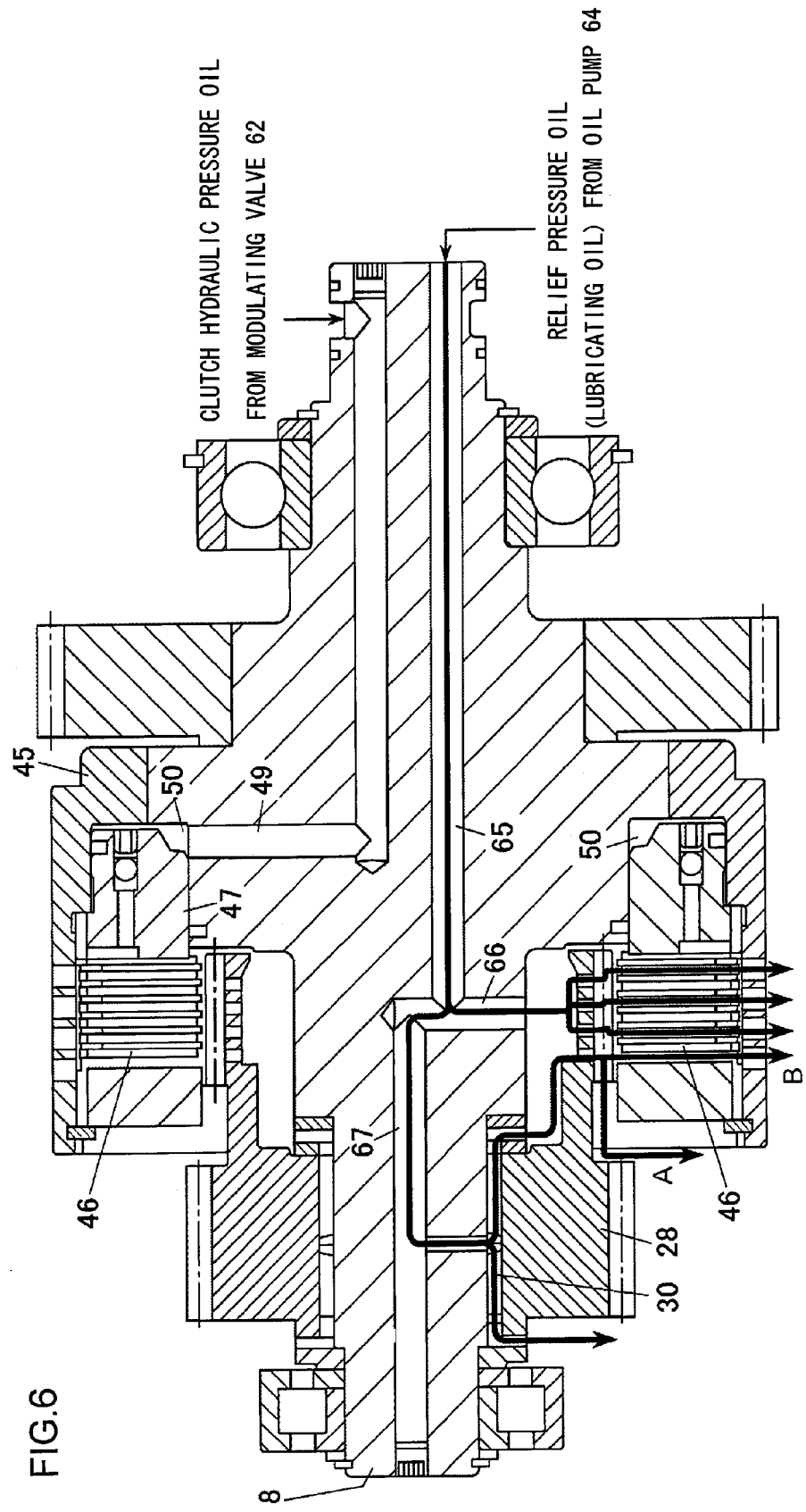
FIG. 6 shows the clutch hydraulic oil passage and the lubricating oil passage formed at the counter shaft.

FIG. 6 shows the clutch hydraulic oil passage and the lubricating oil passage formed at the counter shaft 8. As shown in FIG. 6, the clutch hydraulic oil passage 49 and a lubricating oil passage 65 are formed at the counter shaft 8. The oil output from the oil pump 64 is guided to the oil passages 49 and 65 to be used as clutch hydraulic oil and lubricating oil. As mentioned earlier, the clutch hydraulic oil passage 49 is connected to the oil chamber 50, and thus, the pressure of the oil output from the oil pump 64 is supplied into the oil chamber 50 at the hydraulic clutch 29. The lubricating oil passage 65 branches into two oil passages 66 and 67 so as to guide the lubricating oil supplied from the oil pump 64 to the hydraulic clutch 29 and the bearing 30 supporting the output-side counter gear 28.

(Parking Brake)

FIG. 7 shows the parking brake 23 in detail. The parking brake 23, which is a hydraulic brake used when parking the work vehicle, is disposed at the rear end of the second motor shaft 7. The parking brake 23 is a negative-type brake, which is engaged in operation by a brake releasing oil pressure supplied from an oil pump (not shown) installed in the work vehicle, assumes a braking state when the oil pressure is not supplied and assumes a brake release state when the hydraulic pressure oil is supplied.

The parking brake 23 is disposed in an area enclosed by the sub-case 11, the cylindrical front end cover 12c and the lid-shaped rear end cover 12d. The parking brake 23 includes a ring member 54 spline-connected to the rear end of the second motor shaft 7, a brake disk unit 55 disposed between the ring member 54 and the front end cover 12c, a piston 56 and a plurality of pressure-applying springs 57 that apply pressure to the piston 56.

The brake disk unit 55, assuming a structure similar to that of the clutch disk unit 46, includes a plurality of first brake plates and a plurality of second brake plates alternately disposed along the axial direction. The first brake plates each include an engaging portion located on the outer circumferential side thereof, which engages the inner circumferential portion of the front end cover 12c, whereas the second brake plates each include an engaging portion located on the inner circumferential side thereof, which engages with the outer circumferential portion of the ring member 54. The first and second brake plates have friction surfaces.

The piston 56 is formed so as to move freely along the axial direction over the internal circumferential area of the front end cover 12c, with an oil chamber 58 formed between the piston and the front end cover 12c. The plurality of springs 57, disposed between the piston 56 and the rear end cover 12d, apply pressure to the piston 56 toward the brake disk unit 55. As the second motor shaft 7 is braked by the force of the pressure applied via the springs 57, the parking brake is engaged. The brake on the second motor shaft 7 is released and the parking brake is released as the brake releasing pressure oil is supplied into the oil chamber 58.

(Hydraulic Circuit)

The hydraulic circuit in the power transmission device 100 is now explained in detail in reference to FIG. 3. As shown in FIG. 1, the control valve unit 60 is disposed atop the case 5 at the power transmission device 100. The control valve unit 60 includes a main valve 61, a modulating valve 62, a relief valve 63 and the like. The main valve 61, through which on (connect)/off (disconnect) control is executed for the hydraulic clutch 29, is controlled via an electromagnetic solenoid. Via the modulating valve 62, the hydraulic clutch 29 is gradually turned on as the modulating valve 62 receives the oil pressure from the main valve 61. The relief valve 63 is disposed between the hydraulic pump 64 and the main valve 61 and the lubricating oil originating from the oil pump 64 is guided via the relief valve 63 to the lubricating oil passage 65 at the counter shaft 8, through which the lubricating oil is delivered to various parts of the counter shaft 8 and, in particular, to the area around the hydraulic clutch 29.

(Operations)

Next, the operations executed by the power transmission device 100 when the work vehicle is in a traveling state are explained.

In a low-speed traveling state, the clutch hydraulic pressure oil from the oil pump 64 is supplied into the oil chamber 50 at the hydraulic clutch 29 via the oil passage 49. Thus, the piston 47 presses against the clutch disk unit 46, setting the hydraulic clutch 29 in an engaged state (power transmission state). In the power transmission state, the motive power from the first hydraulic motor 2 input to the first motor shaft 6 is transmitted from the first gear 17 to the input-side counter gear 27 and is further transmitted to the output shaft 9 via the hydraulic clutch 29, the output-side counter gear 28 and the output gear 36. Concurrently, the motive power from the second hydraulic motor 3 input to the second motor shaft 7 is transmitted to the output shaft 9 via the second gear 22 and the output gear 36. In other words, the hydraulic clutch 29 is controlled so as to sustain an engaged state in the low-speed traveling state. Thus, the motive power from both the first hydraulic motor 2 and the second hydraulic motor 3 is transmitted to the output shaft 9, making it possible to drive the load with high torque.

As shown in FIG. 6, the lubricating oil from the oil pump 64 is supplied into the lubricating oil passage 65 via the relief valve 63. The lubricating oil traveling through the oil passages 65, 66 and 67 is guided toward the inner circumferential portion of the clutch disk unit 46 and the bearing 30. It is to be noted that the second clutch plates in the clutch disk unit 46 each have an oil groove through which the lubricating oil passes from the inner circumferential portion to the outer circumferential portion, formed at each of the two surfaces thereof. Even when the hydraulic clutch 29 is in an engaged state, the lubricating oil traveling through the oil grooves formed at the second clutch plates is dispersed around the hydraulic clutch 29 as indicated by the arrows B, as the counter shaft 8 rotates. In addition, the excess lubricating oil that does not pass through the oil grooves formed at the second clutch plates is dispersed around the hydraulic clutch 29 as indicated by the arrow A as the counter shaft 8 rotates.

In a high-speed traveling state, no clutch hydraulic pressure oil is supplied into the oil chamber 50 at the hydraulic clutch 29 and, thus, the piston 47 assumes a position set apart from the clutch disk unit 46 due to the force applied by the return spring (not shown). Under these circumstances, no pressure is applied to the clutch disk unit 46 and the hydraulic clutch 29 assumes a disengaged state (power cut-off state). In the power cut-off state, the motive power from the first hydraulic motor 2 is not transmitted to the output shaft 9 and the motive power from the second hydraulic motor 3 input to the second motor shaft 7 alone is transmitted to the output shaft 9 via the second gear 22 and the output gear 36. In other words, the hydraulic clutch 29 is disengaged and the load is driven at high speed in the high-speed traveling state. It is to be noted that even while the hydraulic clutch 29 is in the disengaged state, the motive power from the second hydraulic motor 3 causes the output-side counter gear 28 to rotate.

As shown in FIG. 6, the lubricating oil supplied from the oil pump 64 via the relief valve 63 in the high-speed traveling state is guided to the inner circumferential portion of the clutch disk unit 46 and the bearing 30 through the oil passages 65, 66 and 67. Since the clutch disk unit 46 is not subjected to any pressure, the lubricating oil is mainly dispersed around the hydraulic clutch 29 through the clearance between the first clutch plates and the second clutch plates at the clutch disk unit 46, as indicated by the arrows B as the second clutch plates linked with the output-side counter gear 29 rotate.

As explained above, the lubricating oil from the oil pump 64 supplied to the counter shaft 8, is then guided to the hydraulic clutch 29 via the oil passage 65 at the counter shaft 8 when the work vehicle is in the low-speed traveling state or the high-speed traveling state. Thus, as the counter shaft 8 rotates in the low-speed traveling state or the output-side counter gear 28 rotates in the high-speed traveling state, the lubricating oil supplied to the hydraulic clutch 29 is dispersed around. In the embodiment, the counter shaft 8 and the hydraulic clutch 29 are disposed over the central area inside the case 5 at positions set apart from the first and second motor shaft 6 and 7 by substantially equal distances. As a result, the lubricating oil dispersed from the hydraulic clutch 29 and from the surrounding area is then supplied substantially evenly to the first motor shaft 6 and the second motor shaft 7 disposed over the right-side area and the left-side area. Consequently, the bearings 15 and 20 and the gears 17 and 22 disposed at the motor shafts 6 and 7 the output shaft 9 and the like can be substantially uniformly lubricated. The lubricating oil is dispersed from the hydraulic clutch 29 and the surrounding area can be distributed over the various parts of the counter shaft 8 with a particularly high level of efficiency, since the counter shaft 8 assumes a position higher than the first and second motor shafts 6 and 7.

It is to be noted that the dispersed lubricating oil is allowed to advance toward the hydraulic motors 2 and 3 with a high level of efficiency via the through holes 10b and 10c formed above the openings at the front wall 10a of the main case 10. Through the through holes 10b and 10c formed above the openings, the lubricating oil reaches the areas between the bearing 15 and the hydraulic motor 2 and between the bearing 20 and the hydraulic motor 3. Thus, the splines present between the hydraulic motor 2 and the first motor shaft 6 and between the hydraulic motor 3 and the second motor shaft 7, as well as the bearings 15 and 20, are lubricated effectively.

(Failure in the Hydraulic System)

The operation executed when an abnormality has occurred in the hydraulic system in the power transmission device 100 while the work vehicle is traveling at high speed is now explained. Even if an error occurs in the hydraulic system, disabling delivery of the oil pressure to the hydraulic clutch 29 in the high-speed traveling state, the hydraulic clutch 29 remains in the OFF state since no clutch hydraulic pressure oil has been supplied into the oil chamber 50 and thus, the piston 47 has not imparted any pressure force in the first place. Under these circumstances, the motive power from the low speed side first hydraulic motor 2 is not transmitted to the output shaft. For this reason, even if an error has occurred in the hydraulic system in the high-speed traveling state, the low speed side first hydraulic motor 2 remains disconnected as intended by the operator and thus, no abrupt braking force is applied.

In addition, if the brake releasing oil pressure supply stops due to an error occurring in the hydraulic system that supplies the brake releasing oil pressure to the parking brake 23 in the high-speed traveling state, the parking brake 23 enters a braking state to apply a braking force to the second motor shaft 7. Thus, the work vehicle can be brought to a stop with a gentle brake applied by the parking brake 23.

It is to be noted that while an explanation is given above on an example in which the parking brake 23 is engaged in operation by the pressure oil supplied from the oil pump (not shown) is installed in the work vehicle, a structure in which a common hydraulic system engages both the parking brake 23 and the hydraulic clutch 29 in operation may be adopted instead. For instance, a pipeline may be structured so as to guide the pressure oil from the oil pump 64 in FIG. 3 to the parking brake 23 as well. In this case, the pressure oil is not supplied to the hydraulic clutch 29, the low speed side hydraulic motor 2 remains disconnected from the output shaft 9 and no sudden braking force is applied in the event of a failure in the hydraulic system of the power transmission device 100 while the work vehicle is in the high-speed traveling state. In addition, since the brake releasing pressure oil supply to the parking brake 23 stops, the parking brake 23 is engaged to apply a gentle brake.

(Advantageous Effects of the Embodiment)

(1) The counter shaft 8 and the hydraulic clutch 29 are disposed over the central area inside the case 5 at the power transmission device 100, whereas the first motor shaft 6 and the second motor shaft 7 are disposed respectively in the right-side area and in the left-side area in the case 5. The counter shaft 8 assumes a position set apart from the first and second motor shafts 6 and 7 over substantially equal distances and higher than the first and second motor shafts 6 and 7. Thus, the lubricating oil from the hydraulic clutch 29 can be efficiently and uniformly dispersed to the various parts inside the case 5.

(2) The hydraulic clutch 29, which is a positive-type hydraulic clutch, assumes a simple structure. Unlike the positive-type hydraulic clutch 29, a negative-type hydraulic clutch, which is normally in a connected state and supplies the oil pressure as it is disconnected, requires oil pressure for disengaging the clutch, at a level high enough to exceed the level of the spring force of the spring pressing against the clutch by a sufficient margin. While the installation length of such a spring needs to be kept down in order to provide the power transmission device 100 as a compact unit, a small installation length allocated to the spring, then, requires a higher oil pressure for disengaging the clutch. While the clutch can be disengaged with a relatively low oil pressure by increasing the installation length of the spring, the greater installation length will result in greater clutch assembly dimensions and thus, the power transmission device will not be provided as a compact unit. The oil pressure supplied to engage the positive-type hydraulic clutch 29 used in the embodiment only needs to be equivalent to the sum of the force used to press against the clutch 29 and the spring force of the return spring, which is fairly small. As a result, the positive-type hydraulic clutch 29 can be engaged in operation at a lower oil pressure than used to disengage the clutch in a negative-type hydraulic clutch. Furthermore, the return spring used in conjunction with the positive-type hydraulic clutch 29 is much smaller than the pressure-applying spring used in conjunction with a negative-type hydraulic clutch and thus, the structural design is simplified. In addition, even if a failure occurs in the hydraulic system while the work vehicle is in the high-speed traveling state, the positive-type hydraulic clutch 29 does not become engaged and consequently, the motive power of the low speed side hydraulic motor 2 is not transmitted to the output shaft 9. As a result, no abrupt braking force is applied to the work vehicle due to a failure in the hydraulic system occurring in the high-speed traveling state.

(3) A braking force can be gradually applied via the negative type parking brake 23 in the event of a failure in the hydraulic system that supplies the brake releasing oil pressure, occurring while the work vehicle is traveling at high speed. Let us now consider a structure in which the parking brake 23 and the hydraulic clutch 29 are engaged in operation by a common hydraulic system. In this structure, if a failure occurs in the hydraulic system while the work vehicle is traveling at high speed, the low speed side hydraulic motor 2 remains disconnected from the output shaft 9, no sudden braking force is applied. Instead, as the parking brake 23 is engaged, a gentle braking force is applied. Since the hydraulic clutch 29 is disposed at the counter shaft 8, installing the parking brake 23 at the counter shaft 8 as well will complicate the structure, which could potentially pose difficulty in the design and production phases. For this reason, the parking brake 23 is disposed at the high speed side hydraulic motor shaft 7.

(4) The rotation rate of the counter shaft 8 is set lower than that of the first motor shaft 6 and higher than that of the output shaft 9, and the hydraulic clutch 29 is disposed at the counter shaft. Thus, a bearing with a lower allowable rotation rate can be used as the bearing 30 (see FIG. 5) disposed at the hydraulic clutch 29, compared to the allowable rotation rate for the bearing at a hydraulic clutch 29 disposed at the first motor shaft 6. In addition, a hydraulic clutch 29 with a smaller clutch capacity compared to the capacity that needs to be assured for the hydraulic clutch 29 disposed at the output shaft 9 can be used. When the hydraulic clutch 29 is disposed at the output shaft 9, the input torque at the clutch will increase by an extent corresponding to the speed reducing ratio and accordingly, the clutch will need to have a large capacity, i.e., a greater number of clutch disks will be required.

(5) The lubricating oil supply passage 65 is formed at the counter shaft 8. The lubricating oil supplied via the oil passage formed for purposes of lubricating oil supply is dispersed through numerous holes formed at the outer circumference of the clutch case 45, as the counter shaft 8 rotates or the second clutch plates linked with the output-side counter gear 28, which is in a rotating state at all times, rotate. As a result, effective lubrication is achieved.

(6) The control valve, through which the clutch hydraulic oil pressure supplied from the oil pump (hydraulic source) 64 to the hydraulic clutch 29 is controlled, i.e., the main valve 61 and the modulating valve 62, is disposed in the hydraulic circuit in the power transmission device 100. In addition, the lubricating oil is supplied to the oil passage 65 for lubricating oil supply from the oil pump 64 via the relief valve 63 disposed between the oil pump 64 and the control valve. This structure allows a relief pressure achieving a fairly high pressure level to be supplied to the lubricating system.

(7) The through holes 10b and 10c are formed respectively above the opening at which the first motor shaft 6 is supported and above the opening at which the second motor shaft 7 is supported at the end surface of the case 5 located on the side closer to the first and second hydraulic motors 213, i.e., at the front wall 10*a*. Since the lubricating oil flows into the areas between the first hydraulic motor 2 and the bearing 15 and between the second hydraulic motor 3 and the bearing 20 via these through holes 10*b* and 10*c*, efficient utilization of the lubricating oil is enabled.

(Variations)

The first motor shaft 6 is disposed in the right-side area and the second motor shaft 7 is disposed in the left-side area in the case 5 viewed from the rear side of the power transmission device 100 achieved in the embodiment described above. However, the present invention is not limited to this example and the first motor shaft 6 may be disposed in the left-side area and the second motor shaft 7 may be disposed in the right-side area in the case 5 instead.

While the hydraulic clutch 29 in the embodiment explained above is a positive-type hydraulic clutch, the first motor shaft 6, the second motor shaft 7 and the like can also be lubricated efficiently in conjunction with a negative-type hydraulic clutch. However, it is more desirable to use a positive-type hydraulic clutch, since it has a simpler structure and, at the same time, is more effective in the event of a failure in the hydraulic system.

While the invention has been particularly shown and described with respect to the preferred embodiment and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2005-066705 filed Mar. 10, 2005

The invention claimed is:

1. A hydraulic power transmission device in a work vehicle, which transmits motive power from two hydraulic motors disposed in parallel to each other, comprising;
   a case;
   a first motor shaft and a second motor shaft respectively disposed in a right-side area and in a left-side area inside the case, each linked to one of the two hydraulic motors;
   a counter shaft disposed in an area ranging between the first motor shaft and the second motor shaft in the case;
   an output shaft;
   a first transmission mechanism that transmits motive power from the first motor shaft to the output shaft via the counter shaft;
   a second transmission mechanism that transmits motive power from the second motor shaft to the output shaft; and
   a hydraulic clutch device disposed at the counter shaft, that transmits the motive power from the first motor shaft to the output shaft or cuts off transmission of the motive power.

2. A hydraulic power transmission device according to claim 1, wherein:
   the counter shaft is disposed in parallel to the first motor shaft and the second motor shaft at a position set apart from the first motor shaft and the second motor shaft by substantially equal distances.

3. A hydraulic power transmission device according to claim 1, wherein:
   the counter shaft is disposed higher up than the first motor shaft and the second motor shaft.

4. A hydraulic power transmission device according to claim 1, wherein:
   the output shaft is disposed below the counter shaft.

5. A hydraulic power transmission device according to claim 1, wherein:
   the hydraulic clutch device is configured to enter a power transmission state as pressure oil is supplied to the hydraulic clutch device and to enter a power cut-off state when pressure oil is not supplied to the hydraulic clutch device.

6. A hydraulic power transmission device according to claim 1, wherein:
   the first transmission mechanism comprises an input-side transmission unit that transmits the motive power from the first motor shaft to the counter shaft and an output-side transmission unit that transmits the motive power from the counter shaft to the output shaft; and
   the input-side transmission unit and the output-side transmission unit each reduce a rate of rotation input thereto and transmit power at a reduced rotation rate to an output side.

7. A hydraulic power transmission device according to claim 1, further comprising:
   an output gear fixed to the output shaft, wherein:
   the first transmission mechanism comprises a first gear fixed to the first motor shaft, an input-side counter gear fixed to the counter shaft and meshing with the first gear, and an output-side counter gear disposed at the counter shaft so as to allow relative rotation and meshing with the output shaft;
   the second transmission mechanism comprises a second gear fixed to the second motor shaft and meshing with the output gear; and
   the hydraulic clutch device is disposed between the input-side counter gear and the output-side counter gear.

8. A hydraulic power transmission device according to claim 1, further comprising:
   a hydraulic parking-brake used when parking the work vehicle, wherein:
   the hydraulic parking brake is configured to enter a braking state when no pressure oil is supplied to the hydraulic parking brake and to enter a brake-release state when pressure oil is supplied to the hydraulic parking brake.

9. A hydraulic power transmission device according to claim 8, wherein:
   the hydraulic parking brake is disposed at the second motor shaft.

10. A hydraulic power transmission device according to claim 1, further comprising:
    a lubricating oil supply passage formed at the counter shaft, wherein:
    lubricating oil delivered via the lubricating oil passage is dispersed from the hydraulic clutch device as the counter shaft rotates.

11. A hydraulic power transmission device according to claim 10, further comprising:
    a control valve through which oil pressure supplied from a hydraulic source to the hydraulic clutch device is controlled; and
    a relief valve disposed between the hydraulic source and the control valve, wherein:
    the lubricating oil is supplied to the lubricating oil passage from the hydraulic source via the relief valve.

12. A hydraulic power transmission device according to claim 10, further comprising:
    through holes individually formed above an opening at which the first motor shaft is supported and above an opening at which the second motor shaft is supported at an end surface of the case located toward the two hydraulic motors, wherein:

the lubricating oil advances toward the two hydraulic motors via the through holes.

13. A work vehicle equipped with a hydraulic power transmission device according to claim 1.

14. A hydraulic power transmission device according to claim 2, wherein:

the counter shaft is disposed higher up than the first motor shaft and the second motor shaft.

15. A hydraulic power transmission device according to claim 2, wherein:

the output shaft is disposed below the counter shaft.

16. A hydraulic power transmission device according to claim 3, wherein:

the output shaft is disposed below the counter shaft.

17. A hydraulic power transmission device according to claim 2, wherein:

the hydraulic clutch device is configured to enter a power transmission state as pressure oil is supplied to the hydraulic clutch device and to enter a power cut-off state when pressure oil is not supplied to the hydraulic clutch device.

18. A hydraulic power transmission device according to claim 3, wherein:

the hydraulic clutch device is configured to enter a power transmission state as pressure oil is supplied to the hydraulic clutch device and to enter a power cut-off state when pressure oil is not supplied to the hydraulic clutch device.

19. A hydraulic power transmission device according to claim 4, wherein:

the hydraulic clutch device is configured to enter a power transmission state as pressure oil is supplied to the hydraulic clutch device and to enter a power cut-off state when pressure oil is not supplied to the hydraulic clutch device.

20. A hydraulic power transmission device according to claim 2, wherein:

the first transmission mechanism comprises an input-side transmission unit that transmits the motive power from the first motor shaft to the counter shaft and an output-side transmission unit that transmits the motive power from the counter shaft to the output shaft; and the input-side transmission unit and the output-side transmission unit each reduce a rate of rotation input thereto and transmit power at a reduced rotation rate to an output side.

* * * * *